United States Patent
Naicker et al.

(10) Patent No.: US 12,410,285 B2
(45) Date of Patent: Sep. 9, 2025

(54) BIOPOLYMER PARTICLE PREPARATION

(71) Applicant: Naturbeads Ltd, Malmesbury (GB)

(72) Inventors: Lolan Naicker, Malmesbury (GB); Davide Mattia, Malmesbury (GB); Janet Lesley Scott, Malmesbury (GB)

(73) Assignee: Naturbeads Ltd, Malmesbury (GB)

( * ) Notice: Subject to any disclaimer, the term of this patent is extended or adjusted under 35 U.S.C. 154(b) by 608 days.

(21) Appl. No.: 17/915,734

(22) PCT Filed: Mar. 31, 2021

(86) PCT No.: PCT/GB2021/050804
§ 371 (c)(1),
(2) Date: Sep. 29, 2022

(87) PCT Pub. No.: WO2021/198688
PCT Pub. Date: Oct. 7, 2021

(65) Prior Publication Data
US 2023/0128373 A1    Apr. 27, 2023

(30) Foreign Application Priority Data

Apr. 1, 2020 (GB) .................................. 2004824

(51) Int. Cl.
| | | |
|---|---|---|
| *C08J 3/12* | (2006.01) | |
| *B01F 23/41* | (2022.01) | |
| *B01F 25/452* | (2022.01) | |
| *C08J 3/09* | (2006.01) | |

(52) U.S. Cl.
CPC ............. *C08J 3/12* (2013.01); *B01F 23/4105* (2022.01); *B01F 23/4142* (2022.01); *B01F 23/4143* (2022.01); *B01F 23/4146* (2022.01); *B01F 25/4522* (2022.01); *C08J 3/096* (2013.01); *C08J 2301/02* (2013.01)

(58) Field of Classification Search
None
See application file for complete search history.

(56) References Cited

U.S. PATENT DOCUMENTS

| | | |
|---|---|---|
| 6,541,627 B1 | 4/2003 | Ono et al. |
| 10,233,261 B1 | 3/2019 | Alston et al. |
| 2011/0268806 A1 | 11/2011 | Bakker et al. |

FOREIGN PATENT DOCUMENTS

| | | |
|---|---|---|
| WO | 2005105278 A2 | 11/2005 |
| WO | 2005105278 A3 | 11/2005 |

OTHER PUBLICATIONS

PCT International Search Report and Written Opinion, Application No. PCT/GB2021/050804, dated Jun. 18, 2021.

*Primary Examiner* — Jeffrey D Washville
(74) *Attorney, Agent, or Firm* — MacMillan, Sobanski & Todd, LLC

(57) ABSTRACT

The present disclosure provides a method for preparing biopolymer particles, said method comprising a membrane emulsification of a dispersed phase into a continuous phase wherein the dispersed phase comprises the biopolymer in a solvent, and wherein passing the dispersed phase through the membrane forms an emulsion of the biopolymer in the continuous phase; and a phase inversion with an anti-solvent to form particles of the biopolymer; wherein prior to (b), the emulsion is cooled to a temperature, T1. Also provided are biopolymer particles obtained from the method.

14 Claims, 5 Drawing Sheets

(a)

(b)

(c)

(d)

BIOPOLYMER PARTICLE PREPARATION

This application is the national stage entry of international application PCT/GB2021/050804, filed under the authority of the Patent Cooperation Treaty on Mar. 31, 2021, published; which claims priority to United Kingdom Application No. 2004824.5, filed on Apr. 1, 2020. The entire disclosure of each the aforementioned applications is incorporated herein by reference for all purposes.

FIELD

The present invention relates generally to a method for preparing biopolymer particles, and more particularly, to a method that leads to an improved yield of said biopolymer particles, where yield is defined herein. The present invention also provides biopolymer particles obtained by the inventive method.

BACKGROUND

Biopolymers are an important development in the reduction of consumer products' environmental footprint. Materials made from polymers are widely used because of their adaptability, durability and price, so much so that it is difficult to identify consumer products that do not contain any polymeric material. However, many synthetic polymers that have been developed are mainly derived from petroleum and coal as raw materials meaning that they are incompatible with the environment and reliant on an unsustainable resource. Polymer particles in particular pose serious ecological problems because they often remain in ecosystems following disposal of the product by the consumer. Biopolymers and biopolymer particles thus go a long way in addressing these problems since they are often biodegradable as well as being derived from renewable and sustainable raw materials. However, the production of biopolymer particles can be challenging.

One method which has been used to prepare biopolymer particles is membrane emulsification followed by phase inversion. In the membrane emulsification process, a dispersed phase of a biopolymer is forced through pores of a microporous membrane directly into a continuous phase so as to form an emulsion from which the particles can be extracted. Various problems are, however, encountered with this process including coalescence or aggregation of particles in the continuous phase. Phase inversion involves exposing the emulsion to an anti-solvent, e.g. by immersing the emulsion into the anti-solvent, and deformation during exposure/immersion can occur as well as further aggregation and coalescence.

Overall there remains a need in the art for a method of preparing biopolymer particles which does not suffer from the above-mentioned problems. In particular, a method that prevents coalescence, aggregation and/or deformation of biopolymer particles and thereby an improved yield.

SUMMARY

It is an object of the present invention to provide a method for preparing biopolymer particles, the method comprising (a) a membrane emulsification of a dispersed phase into a continuous phase wherein the dispersed phase comprises the biopolymer in a solvent, and wherein passing the dispersed phase through the membrane forms an emulsion of the biopolymer in the continuous phase, and (b) a phase inversion with an anti-solvent to form particles of the biopolymer. The method including, prior to (b), the cooling of the emulsion to a temperature, $T_1$, where $T_1$ is greater than the pour point of the continuous phase ($T_{cont}$) but equal to or less than a transition temperature of the dispersed phase ($T_{disp}$). The transition temperature of the dispersed phase is selected from the group consisting of freezing point, glass transition temperature and pour point.

$T_1$ is defined as: $T_{cont} < T_1 \leq T_{disp}$; wherein $T_{disp} > T_{cont}$.

In various embodiments of the present invention, the anti-solvent is aqueous, i.e. it comprises water. In various embodiments of the present invention, the anti-solvent comprises an organic solvent, e.g. an alcohol, acetone or the like. In various embodiments, the anti-solvent comprises an organic solvent and water. In various embodiments of the present invention, the anti-solvent is cooled. The anti-solvent may, for example, be cooled to a temperature $T_2$, for the phase inversion (b), $T_2$ being less than $T_{disp}$. Preferably $T_2$ is substantially equal to $T_1$, more preferably $T_2$ is equal to $T_1$.

In various embodiments of the present invention, the membrane emulsification is selected from the group consisting of a cross-flow membrane emulsification, a rotational membrane emulsification, a vibrational membrane emulsification, and combinations thereof. Preferably, the membrane emulsification involves a cross-flow membrane emulsification.

In various embodiments of the present invention, the cooling of the emulsion takes place at the outlet of the membrane, e.g. as the emulsion of dispersed phase in continuous phase is formed. In various embodiments of the present invention, the continuous phase comprises a nonpolar solvent. In various embodiments of the present invention, the dispersed phase comprises a polar solvent.

In various embodiments of the present invention, the phase inversion is carried out under shear. In various embodiments, the phase invention comprises a filtration process. In various embodiments, the phase inversion is carried out under shear and involves a filtration process.

In various embodiments of the present invention, the method is continuous.

In various embodiments of the present invention, after the phase inversion (b), the anti-solvent/continuous phase mixture is removed from the particles.

In various embodiments of the present invention, the biopolymer is a polysaccharide. Preferably the biopolymer is cellulose.

It is another object of the present invention to provide biopolymer particles obtained by the method described herein. Features described herein in the context of the method are also therefore applicable to the biopolymer particles obtained by the method. Biopolymer particles obtained by the method described herein are distinguishable over the prior art because of their increase in yield and regularity of size and shape. Such regularity can be seen from e.g. FIG. 5(b).

These objects and embodiments are set out in the appended independent and dependent claims. It will be appreciated that features of the dependent claims may be combined with each other and with features of the independent claims in combinations other than those explicitly set out in the claims. Furthermore, the approaches described herein are not restricted to specific embodiments such as those set out below, but include and contemplate any combinations of features presented herein.

The foregoing and other objects, features, and advantages of the invention will appear more fully hereinafter from a consideration of the detailed description that follows along with the accompanying drawings. It is to be expressly understood, however, that the drawings are for illustrative purposes and are not to be construed as defining the limits of the invention.

BRIEF DESCRIPTION OF THE DRAWINGS

FIG. 5 includes two photographs.

DETAILED DESCRIPTION

While various exemplary embodiments are described or suggested herein, other exemplary embodiments utilizing a variety of methods and materials similar or equivalent to those described or suggested herein are encompassed by the general inventive concepts. Those aspects and features of embodiments which are implemented conventionally may not be discussed or described in detail in the interests of brevity. It will thus be appreciated that aspects and features of apparatus and methods described herein which are not described in detail may be implemented in accordance with any conventional techniques for implementing such aspects and features.

Figure 1:
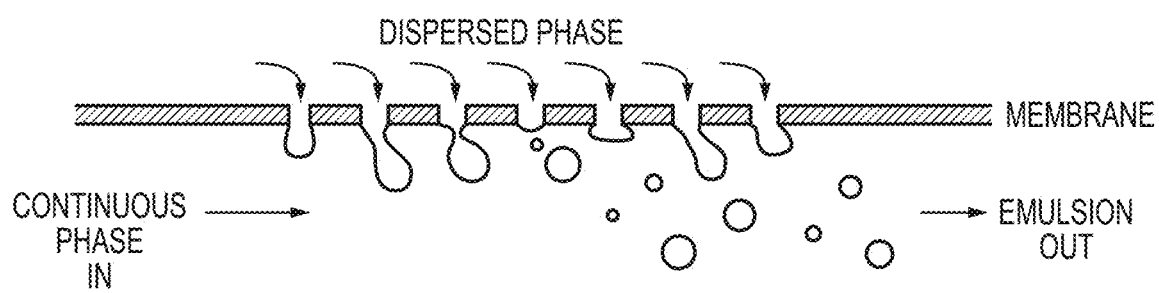
FIG. 1 is a schematic representation of membrane emulsification.

The general inventive concept is centred on increasing the yield of biopolymer particles from a membrane emulsification and phase inversion process, where the term "yield" refers to the mass of spherical particles or beads within a defined size distribution. Membrane emulsification is known in the art; it is a technique in which a dispersed phase is forced through the pores of a microporous membrane directly into a continuous phase, where emulsified droplets are formed and detached at the end of the pores with a drop-by-drop mechanism. A schematic representation of a membrane emulsification process is shown in FIG. 1, where the arrow indicates the direction of flow.

The dispersed phase generally includes a first liquid containing the biopolymer dissolved in a solvent, and the continuous phase includes a second liquid which is immiscible with the first liquid. The interaction of the two liquids when the dispersed phase is pushed or otherwise transported through the membrane is called a dispersion process, and their inhomogeneous mixture is termed an emulsion, i.e. droplets of the dispersed phase surrounded by the continuous phase.

The advantages of membrane emulsification over conventional emulsification are recognised in the art; they include the ability to obtain very fine emulsions of controlled droplet sizes and narrow droplet size distributions. In addition, successful emulsification can be carried out with much less consumption of emulsifier and energy, and because of the lowered shear stress effect, membrane emulsification allows the use of shear-sensitive ingredients, such as starch and proteins. In order to expand the industrial application of membrane emulsification, it has, however, been recognised that the productivity of this method must be increased.

In the context of producing biopolymers, the droplets of dispersed phase in continuous phase have been successfully isolated by phase inversion. In the context of cellulose, this is described in *ACS Sustainable Chem. Eng.* 2017, 5, 7, 5931-5939, which is incorporated herein by reference. Phase inversion is a chemical phenomenon exploited in the fabrication of artificial membranes, and is performed by removing solvent from a liquid-polymer solution. There are various methods of phase inversion including immersing the polymer solution into a third liquid called the anti-solvent. The use of anti-solvent based phase inversion has proven to be particularly effective in precipitating droplets of biopolymer into particles from an emulsion of dispersed/continuous phase.

Unfortunately, however, dispersed phase droplets in the emulsion are at risk of taking part in undesirable processes which reduce yield—where yield mentioned herein refers to the mass of spherical particles or beads within a defined size distribution. The droplets can irreversibly interact with one another (otherwise referred to herein as coalescence or aggregation), and/or irreversibly deform, for example, during phase inversion.

Figure 2:
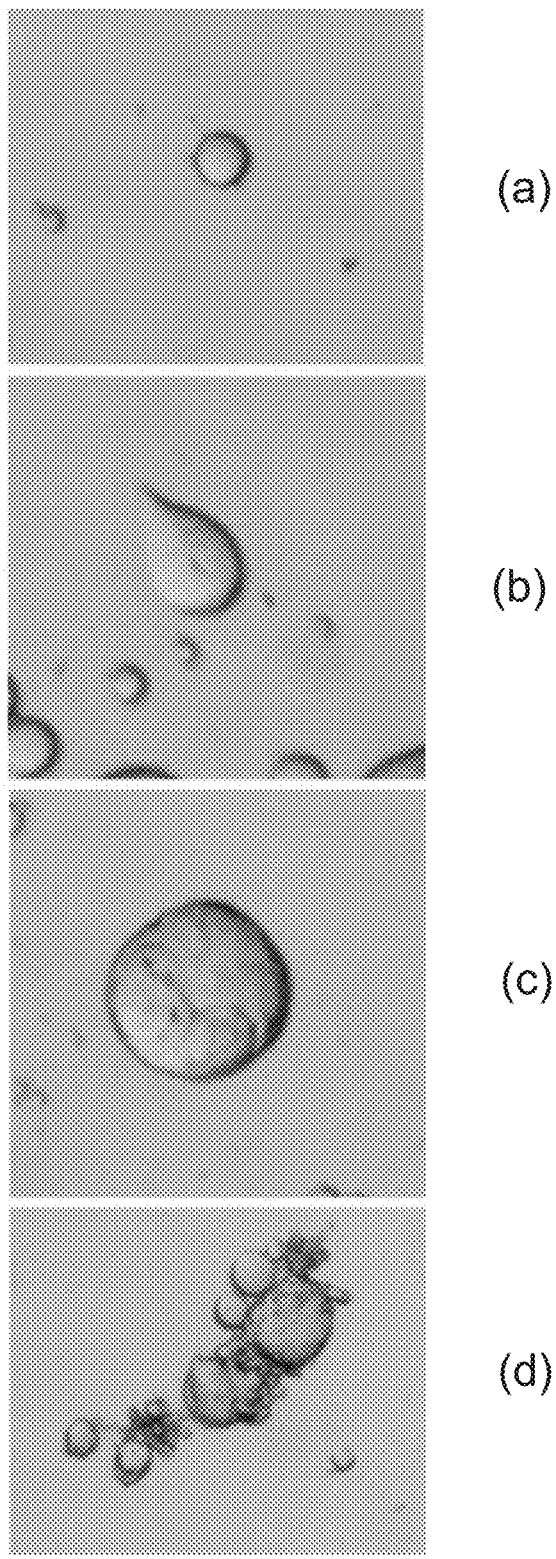
FIG. 2 contains four photographs of particles showing an example of a desired particle size (<50 µm) and shape (spherical) (FIG. 2(a)), along side the deformation and aggregation problems that occur in the prior art (FIGS. 2(b) to 2(d)).

Four biopolymer particle shapes are shown in FIGS. 2(a) to 2(d). FIG. 2(a) shows an exemplary particle shape and size which may be desirable in certain applications: an individual spherical bead with a diameter of <50 µm; FIG. 2(b) shows an undesirable shape deformation: an individual tear-drop shaped particle; FIG. 2(c) shows an undesirable coalescence of multiple spherical particles having a diameter of >200 µm; and FIG. 2(d) shows an undesirable asymmetric aggregation of multiple beads. Deformation and aggregation impact both the size and shape distribution of the biopolymer particles and this has a negative effect on the biopolymer particle yield.

In-situ inspection of the particles during formation is challenging and so it is only possible to theorise as to where and how any deformed shapes, coalesced structures, aggregated structures etc. are formed. Without wishing to be bound by any one theory, the inventors believe that dispersed phase droplets may undesirably interact with each other when flowing in the apparatus typically used for membrane emulsification or in the process piping, fittings, and equipment thereafter. These droplets may, for example, coalesce when there are changes in the fluid transport flow regime such as laminar to turbulent transition points, recirculation zones, flow direction changes etc. Another theory is that dispersed phase droplets may, for example, be deformed by shear forces during the phase inversion process (e.g. as the emulsion flows through the anti-solvent) and that these deformed shapes (e.g. tear drop) may be preserved by the anti-solvent. Dispersed phase droplets may also interact during the phase inversion process before or during contact with the anti-solvent, and may coalesce to create a larger droplet or group together to create a larger structure which is then preserved by the anti-solvent. Other mechanisms may also exist, including the consumption of smaller phase inverted particles by larger droplets during the phase inversion process and subsequent preservation of these structures by the anti-solvent.

The present invention surprisingly avoids these deformation and aggregation issues and thereby improves the overall yield. This improvement in yield is achieved by cooling the emulsion formed by membrane emulsification to a temperature $T_1$ prior to phase inversion. In particular, $T_1$ is greater than (i.e. higher than) the pour point of the continuous phase and equal to or less than (i.e. lower than) a transition temperature of the dispersed phase as defined herein, provided that the transition temperature of the dispersed phase is greater than/higher than the pour point of the continuous phase. Since deformation and aggregation are believed to take place when dispersed phase droplets are in a liquid state, the cooling of the emulsion to or below the pour point of the dispersed phase is believed to temporarily change—at least partially—the emulsion's "colloid class" from an emulsion—i.e. liquid-in-liquid—to a sol—solid-in-liquid—and thereby result in the dispersed phase being easier to work with in downstream processes.

In addition, the dispersed phase having a transition temperature—the transition temperature being selected from the group consisting of freezing point, glass transition temperature and pour point—which is higher than the continuous phase pour point, means that the continuous phase surrounding the solidified dispersed phase is still able to function as a transport medium. A diagrammatic representation of an emulsion undergoing cooling and temporary conversion to a sol within a cooling coil heat exchanger is shown in FIG. 3(b).

Figure 3:
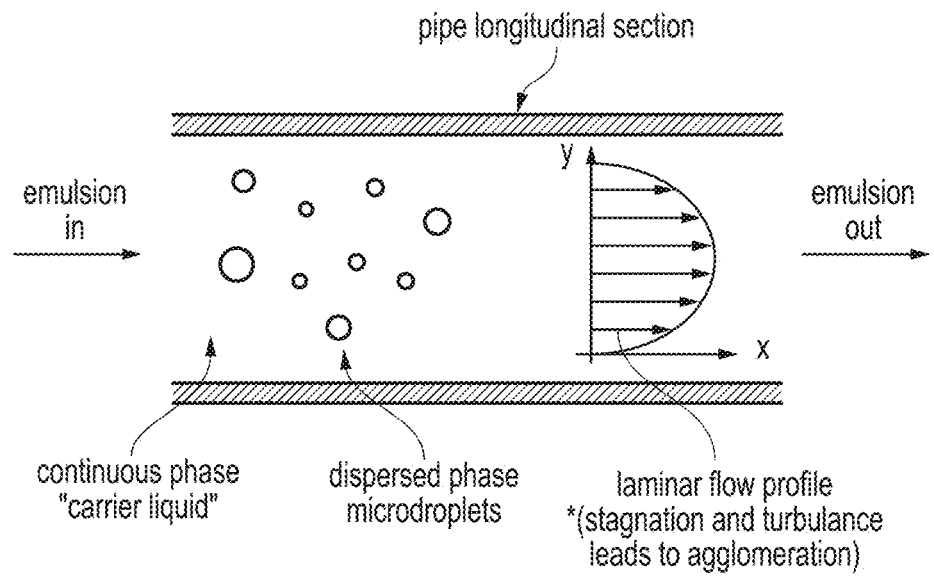
FIG. 3 contains a schematic representation of a prior art process (FIG. 3(a)), and a representation of an embodiment of the emulsion cooling according to the present invention (FIG. 3(b)).
Figure 3:
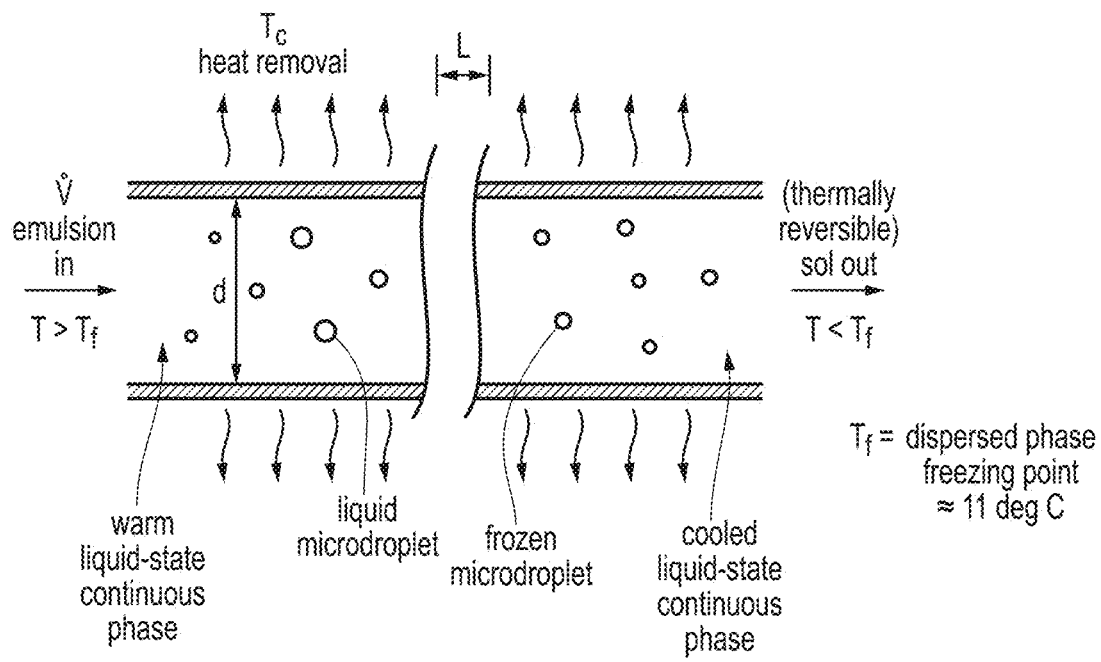

FIG. 3(a) is a representation of the prior art; the continuous phase forms an emulsion with the dispersed phase droplets (microdroplets in this example; see definition below), and the stagnation and turbulence in flow causes undesirable coalescence and a reduced yield. FIG. 3(b) is then an example where the emulsion is cooled within a coil heat exchanger to a temperature below the dispersed phase transition temperature but higher than the continuous phase pour point so that the continuous phase remains mobile and is able to transport the transitioned droplets. The exemplary embodiment of FIG. 3(b) avoids the coalescence, deformation, aggregation of particles and consequential reduction of yield encountered with the prior art process of FIG. 3(a).

Unless defined otherwise, all technical and scientific terms used herein have the same meaning as commonly understood by one of ordinary skill in the art to which the invention belongs.

By the term "biopolymer" is meant a polymer produced by living organisms. In other words, a polymeric biomolecule. There are three main classes of biopolymers, classified according to the monomeric units used and the structure of the biopolymer formed: polynucleotides (RNA and DNA), which are polymers composed of 13 or more nucleotide monomers; polypeptides, which are polymers of amino acids; and polysaccharides, which are typically polymeric carbohydrate structures. Other examples of biopolymers include rubber, suberin, melanin, chitin and lignin, preferably chitin and lignin.

In various embodiments of the present invention, the biopolymer is selected from the group consisting of polynucleotides, polypeptides and polysaccharides. Preferably the biopolymer is selected from the group consisting of polypeptides and polysaccharides. More preferably, the biopolymer is a polysaccharide, for example, starch, cellulose, chitin, chitosan or glycogen. Most preferably the biopolymer is starch or cellulose.

The term "particle" is used interchangeably herein with "bead" and refers to a solid formed following phase inversion of a dispersed phase droplet. In various embodiments of the invention, the particles or beads are microparticles or microbeads. As would be understood by the person skilled in the art, microparticles or microbeads are particles/beads with a diameter between 1 and 1000 microns (µm). Such particles are readily identified by a person skilled in the art, for example, using an optical microscope image and image analysis software with a suitable detection algorithm (e.g. ImageJ using an edge detection algorithm), laser diffraction with commercially available equipment such as Mastersizer from Malvern Panalytical (e.g. Mastersizer 3000), or with an appropriately sized sieve.

The membrane emulsification step of the inventive method involves passing a dispersed phase through a membrane into a continuous phase so as to form an emulsion. The membrane is not limited; it can be any porous structure suitable for a membrane emulsification process. For example, the membrane may be a plate with holes acting as pores (e.g. micron-sized holes), a perforated metal tube, or sintered porous glass.

By the term "emulsion" is meant the class of two-phase systems of matter where both phases are liquid. Emulsions are a type of colloid, and generally consist of two immiscible liquids. In various embodiments of the present invention the emulsion may be a macro-emulsion; this is an emulsion in which the particles of the dispersed phase have diameters of approximately 1 to 1000 microns. The term "sol" refers to a general class of two-phase systems of matter where the continuous phase is liquid and the dispersed phase is solid.

The term "agglomerate" refers to a structure composed of primary particles which can typically be dispersed again. The term "aggregate" refers to a structure composed of primary particles which cannot be dispersed again.

The term "pour point" refers to the temperature below which a substance (e.g. liquid) loses its flow characteristics. It is typically defined as the minimum temperature at which the liquid (e.g. oil) has the ability to pour down from a beaker. The pour point can be measured with standard methods known in the art. ASTM D7346, Standard Test Method for No Flow Point and Pour Point of Petroleum Products and Liquid Fuels may, for example be used. For commercially available materials, the pour point is often provided by the supplier or manufacturer.

The term "freezing point" refers to the temperature at which a substance changes state from liquid to solid at standard atmospheric pressure (1 atmosphere). The freezing point can be measured with standard methods known in the art. ASTM E794, Standard Test Method for Melting and Crystallization Temperatures by Thermal Analysis may, for example, be used. For commercially available materials, the freezing point may be provided by the supplier or manufacturer.

The term "glass transition point" or "glass transition temperature" refers to the temperature at which a polymer structure transitions from a hard or glassy material to a soft, rubbery material. This temperature can be measured by differential scanning calorimetry according to the standard test method: ASTM E1356, Standard Test Method for Assignment of the Glass Transition Temperature by Differential Scanning calorimetry. For commercially available materials, the glass transition temperature may be provided by the supplier or manufacturer.

For ease of reference, these and further features of the present invention are now discussed under appropriate section headings. However, the teachings under each section are not limited to the section in which they are found.

Membrane Emulsification

As noted above, the membrane emulsification is not limited and may be any membrane emulsification process known in the art. For example, the membrane emulsification process may be a cross-flow membrane emulsification, a rotational membrane emulsification, a vibrational membrane emulsification, or a combination thereof. As is understood in the art, the terms "cross-flow", "rotational" and "vibrational" refer to the method used to generate shear on the membrane surface. A continuous phase could, for example, move relative to a stationary membrane to create shear, or the membrane could move relative to stationary phases. Alternatively, the dispersed phase could be injected into a stationary continuous phase. Known process parameters such as membrane type, average pore size and porosity, crossflow velocity, transmembrane pressure and emulsifier may also be used. In various embodiments of the present invention, the membrane emulsification may involve a cross flow system, a stirred-cell tube membrane, a stirred cell-flat membrane, a rotating flat membrane, a vibrating/rotating tube membrane and/or a premixed membrane emulsification.

International Patent Application No. WO 01/45830 describes an example of a rotational membrane emulsification. International Patent Application No. WO 2012/094595 describes an example of a cross-flow membrane emulsification. Pedro S. Silva et al., "*Azimuthally Oscillating Membrane Emulsification for Controlled Droplet Production*", AIChE Journal 2015 Vol. 00, No. 00, describes a vibrational membrane emulsification: specifically a membrane emulsification system comprising a tubular metal membrane which is periodically azimuthally oscillated in a gently cross flowing continuous phase. WO 2019/092461 describes a cross-flow membrane emulsification. Each of these method descriptions is incorporated herein by reference.

In various embodiments of the present invention, the membrane emulsification is a cross-flow membrane emulsification. Preferably an emulsification process in which the continuous phase moves relative to a stationary membrane.

As will be understood by the skilled person in the art, the dispersed phase and continuous phase will depend on the biopolymer being produced. The dispersed phase will comprise a solvent which disperses or dissolves the biopolymer, and the continuous phase will comprise a solvent which is immiscible with the dispersed phase such that an emulsion is formed when the dispersed phase is forced through the porous membrane.

By the term "solvent" is meant any substance (e.g. liquid) which disperses or dissolves the biopolymer. The term "solvent" also includes solvent mixtures.

The identification of suitable solvents for the dispersed and continuous phases is specifically within the common general knowledge of the skilled person. As noted above, all that is required is for the two phases—namely the dispersed phase and the continuous phase—to be immiscible with one another. It therefore follows that the solvents for each of the phases must be immiscible with one another. The solvents may, for example, be aqueous solvents, ionic liquids [a salt in liquid form at a temperature between ambient temperature and 100° C., e.g. imidazolium based ionic liquids such as 1-ethyl-3-methylimidazolium acetate, 1-butyl-3-methylimidazolium chloride or the like], organic solvents or inorganic nonaqueous solvents.

In various embodiments of the present invention, the solvent for the dispersed phase comprises ionic liquids, inorganic nonaqueous solvents, aqueous solvents, or combinations thereof. In various embodiments of the present invention, the solvent for the dispersed phase comprises ionic liquids, inorganic nonaqueous solvents, or combinations thereof. In various embodiments of the present invention, the solvent for the dispersed phase comprises one or more ionic liquid. In other embodiments, the solvent for the dispersed phase comprises organic solvents.

Non-limiting examples of the solvent include water, methanol, ethanol, ammonia, acetone, acetic acid, n-propanol, n-butanol, isopropyl alcohol, ethyl acetate, dimethyl sulfoxide, sulfuryl chloride, phosphoryl chloride, carbon disulfide, morpholine, N-methylmorpholine, NaOH without and with association of urea and thiourea, bromine pentafluoride, hydrogen fluoride, sulfuryl chloride fluoride, acetonitrile, dimethylformamide, hydrocarbon oils and blends thereof, toluene, chloroform, carbon tetrachloride, benzene, hexane, pentane, cyclopentane, cyclohexane, 1,4-dioxane, dichloromethane, nitromethane, propylene carbonate, formic acid, tetrahydrofuran, diethyl ether, phosphoric acid, 1-ethyl-3-methylimidazolium acetate, 1-butyl-3-methylimidazolium chloride, 1-methoxymethyl-3-methylimidazolium bromide, N-ethylpyridinium chloride, N-methylmorpholine-N-oxide, 1-methylimidazole, N,N-dimethylformamide, N, N'-dimethylimidazolidin-2-one, N, N-dimethylacetamide, sulfolane, γ-valerolactone, γ-butyrolactone, N,N,N',N'-tetramethylurea, N-methylpyrrolidinone, and methylene chloride. The skilled person will readily recognise which of the exemplary solvents are ionic liquids, organic solvents, and/or inorganic nonaqueous solvents.

Preferably the solvent used for at least one of the dispersed phase and continuous phase is environmentally friendly. More preferably the solvent used for both the dispersed phase and continuous phase is environmentally friendly. By the term "environmentally friendly" is meant not harmful to the environment such that the solvent can be disposed of without the need for specialist equipment or process(es), i.e. non-toxic.

It is known in the art that polysaccharides have limited dissolution in most of the common solvents. It is also known in the art that those solvents which do dissolve polysaccharides are often toxic and/or highly selective. When the biopolymer is a polysaccharide such as cellulose, starch, chitin, glycogen, and/or chitosan, the solvent for the dispersed phase may therefore comprise an ionic liquid. The dissolution of cellulose with the ionic liquid 1-butyl-3-methylimidazolium chloride is, for example, discussed in Richard et al., J. Am. Chem. Soc. 2002, 124, 4974-4975. Verma et al., Sustainable Chemistry and Pharmacy 13 (2019), 100162 similarly discusses the solubility of cellulose in ionic liquids and ionic liquids with co-solvents. Each of these disclosures is incorporated herein by reference.

The concentration of biopolymer in the dispersed phase is not limited and may be any concentration suitable for membrane emulsification.

The dispersed phase and/or continuous phase may further include optional components. These optional components include, but are not limited to, co-solvents, surfactants, porogens, active ingredients, pockets of air, double emulsions, pigments, and dyes. The level of any of the optional components is not significant in the present invention. In various embodiments, the dispersed phase includes a co-solvent.

The co-solvent is not limited and may be any solvent known in the art, including those described above for the continuous and/or dispersed phase. The co-solvent may further be a co-solvent mixture. Examples of possible co-solvents include water, 1-methylimidazole (1-MI); dimethyl sulfoxide (DMSO); N,N-dimethylformamide (DMF); N,N'-dimethylimidazolidin-2-one (DMI); N,N-dimethylacetamide (DMAc); sulfolane; γ-valerolactone (γ-val); γ-butyrolactone (γ-but); propylene carbonate (PC); N,N,N',N'- tetramethylurea (TMU); and N-methylpyrrolidinone (NMP). For instance, 1-methylimidazole (1-MI); dimethyl sulfoxide (DMSO); N,N-dimethylformamide (DMF); N,N'-dimethylimidazolidin-2-one (DMI); N,N-dimethylacetamide (DMAc); sulfolane; γ-valerolactone (γ-val); γ-butyrolactone (γ-but); propylene carbonate (PC); N,N,N',N'-tetramethylurea (TMU); or N-methylpyrrolidinone (NMP).

The surfactant may be any suitable surfactant known in the art, for example, any ionic or non-ionic surfactant. Ionic surfactants may include sulfates, sulfonates, phosphates and carboxylates such as alkyl sulfates, ammonium lauryl sulfates, sodium lauryl sulfates, alkyl ether sulfates, sodium laureth sulfate and sodium myreth sulfate, dioctyl sodium sulfosuccinate, perfluorooctanesulfonate, perfluorobutanesulfonate, alkyl benzene sulfonates, alkyl aryl ether phosphates, alkyl ether phosphates, and alkyl carboxylates. Non-ionic surfactants may include polyethers, polyoxyalkylene derivatives of hexitol, partial long-chain fatty acid esters such as sorbitan oleates, ethylene oxide derivatives of long-chain alcohols, ethoxylated vegetable oil, polydimethylsiloxanes, and ethylene oxide/propylene oxide copolymers.

Cooling of the Emulsion

The advantages of the present invention primarily stem from the cooling of the emulsion formed by membrane emulsification prior to phase inversion. The emulsion is cooled to a temperature $T_1$, $T_1$ being greater than the pour point of the continuous phase ($T_{cont}$), and equal to or less than a transition temperature selected from the group consisting of the freezing point, glass transition temperature and pour point, of the dispersed phase ($T_{disp}$): wherein $T_{disp} > T_{cont}$. The absolute value of $T_1$ is not, however, critical to the present invention; rather it is the relationship of $T_1$ to the respective temperatures of the dispersed phase and continuous phase that is important.

The method of cooling is not also limited. The emulsion may be cooled by any means known in the art for removing heat (energy) from a system. The emulsion may further be cooled at any point prior to phase inversion. In various embodiments, this means the emulsion is cooled simultaneously with or separately from the membrane emulsification process. The emulsion may, for example, be cooled as it is formed (e.g. by a cooling means located at the outlet of the membrane). Alternatively, the emulsion may be cooled in a step following membrane emulsification, e.g. in a cooling apparatus separate from the membrane emulsification apparatus. Advantageously, the cooling should take place as soon as possible after the emulsification takes place in order to reduce the possibility of liquid state dispersed phase droplets coalescing and/or aggregating.

In various embodiments, the emulsion may be cooled by a cooling medium (e.g. water, ice etc.) at least partially surrounding the vessel where the emulsion is formed. In a preferred embodiment, the vessel (e.g. pipe) where the emulsion is formed may have a cooling jacket containing a cooling medium. The cooling medium is not limited, and includes any medium having a lower temperature than the emulsion.

In various embodiments the emulsion may be cooled by a cooling apparatus connected to the membrane emulsification unit. The cooling apparatus may be a heat exchanger, such as an immersion heat exchanger. In an exemplary embodiment described below, a coil heat exchanger is immersed in a cooling medium (e.g. a cold water bath) but the invention is not limited in this respect. Any type of heat exchanger could, for instance, be used such as a tube-and-shell heat exchanger, a plate-and-frame heat exchanger, or a jacketed tube. Additionally, an immersion heat exchanger could be used with another cooling medium such as anti-freeze, dry ice or the like, in order to cool the emulsion to $T_1$.

Phase Inversion

Phase inversion is not similarly limited and may be any phase inversion process known in the art which involves the use of an anti-solvent. As noted above, phase inversion is performed by removing solvent from a liquid-polymer solution which in this invention is the continuous phase with the frozen dispersed phase contained therein.

The anti-solvent may be any suitable solvent or solvent mixture known in the art. In various embodiments of the present invention, the anti-solvent is aqueous. In various embodiments, the anti-solvent is non-aqueous. The anti-solvent may, for example, comprise an organic solvent such as an alcohol or acetone, or any other organic solvent known in the art. Suitable alcohols include ethanol and/or methanol. In various embodiments the anti-solvent comprises an organic solvent, water or mixtures thereof, for example, alcohol, acetone, water or mixtures thereof.

In various embodiments of the present invention, phase inversion is carried out at ambient temperature, namely between about 20 and 25° C. In such embodiments, the anti-solvent has a temperature between about 20 and 25° C. Alternatively and preferably, the anti-solvent is cooled to a temperature below ambient temperature, namely below about 20° C. In various embodiments of the present invention, the anti-solvent has a temperature $T_2$ which is lower than the freezing point of the dispersed phase. The advantage of controlling the temperature of the anti-solvent ($T_2$) is to prevent pre-mature thawing of the frozen droplets. In various embodiments of the present invention, $T_2$ is equal to $T_1$, where $T_1$ is defined above.

Without wishing to be bound by any one theory, the inventors believe that by cooling the anti-solvent to $T_2$, the droplets remain in a frozen state (and hence spherical and non-aggregated) whilst the continuous phase surrounding them is stripped away by the phase inversion. The anti-solvent is able to contact the surface of the droplets, causing precipitation of the biopolymer and hardening of the precipitate surface. Additionally as the frozen dispersed phase droplet thaws, the anti-solvent will convert the droplet of dissolved biopolymer to a bead/particle thereof, whilst leaching the solvent system into the anti-solvent.

In various embodiments of the present invention, phase inversion is carried out under shear; the skilled person will be aware of suitable shear conditions for phase inversion. Shear may, for example, be achieved through the use of a stirred vessel (e.g. a mechanically stirred vessel) or a settling vessel (e.g. a gravity settling vessel). The term "shear" is used herein to refer to an external force acting on an object or surface parallel to the slope or plane in which it lies, the stress tending to produce strain.

Shear is advantageous because it improves the rate at which the continuous phase is removed from the dispersed phase droplets, and hence the speed of phase inversion as a whole. The phase inversion process is diffusion rate-limited (Fickian diffusion) and shear reduces the thickness of the continuous phase layer surrounding a dispersed phase droplet, reducing the distance travelled by a molecule of anti-solvent to the surface of the dispersed phase droplet and thereby speeds up the phase inversion process. The use of shear is not, however, typically used with current phase inversion processes because of the negative impact it has on particle shape and size. Currently a gentle phase inversion step is used where the emulsion is allowed to settle through stagnant anti-solvent (at room temperature). Surprisingly, frozen state dispersed phase droplets are more tolerant to other methods of separation from the continuous phase and this improved tolerance increases the efficiency of such separation.

In various embodiments of the present invention, phase inversion comprises a filtration process. The filtration process is not limited and may involve mechanical or any other type of filtration (e.g. using equipment known in the art such as a hydrocyclone). A filtration process may also be encompassed by the phase inversion being carried out under shear as described above. In various embodiments, a filtration medium (e.g. filter) may be used to filter the emulsion through the anti-solvent and thereby collect the biopolymer particles. In such embodiments, the emulsion may gravity settle (shear) through the anti-solvent and into the filter, whilst the continuous phase passes through the filter (the filtrate). The frozen droplets may then be collected in the filter as the filter cake.

If not collected as part of phase inversion (e.g. via filtration or otherwise), the biopolymer particles may be separated from the anti-solvent/continuous phase mixture or the anti-solvent/continuous phase mixture may be removed from the particles. The method of removal is not limited. In various embodiments, however, the method of removal depends on whether the method is being operated in batch or continuous mode.

When the method of the invention is being operated in batch mode, the phase inversion step may first be performed in a closed vessel and the resulting mixture then transferred into a decanter vessel and allowed to reach a settled stage. Once settled, layers may be removed sequentially from the bottom of the vessel. Typically the order of the layers can be (1) continuous phase, (2) an interfacial layer comprising wetted biopolymer particles and (3) the remaining anti-solvent. The invention is not, however, limited in this respect and the skilled person will appreciate that the order of the layers will depend on their respective densities.

In various embodiments of the present invention, the method is continuous and to operate in continuous mode, the phase inversion step may be performed under continuous input of emulsion and anti-solvent and continuous output of the multi-phase mixture to a decanter. Within the decanter, a steady-state partition of the mixture may exist and there can be a continuous and preferably simultaneous removal from each of the phases. For example, there may be continuous and preferably simultaneous removal from: (1) the continuous phase, (2) anti-solvent and (3) wetted biopolymer particles. The order of these layers will of course vary and the invention is not limited to any particular order.

Alternatively, the multi-phase (e.g. three phase) mixture may be separated using techniques known in the art, such as a disc stack separator (e.g. a centrifugal separator such as the one manufactured by Andritz).

To provide continuous cooling along side a continuous phase inversion, the cooling medium (e.g. a medium surrounding the vessel containing the emulsion or used with a heat exchanger connected to the membrane emulsification unit) may need to be recycled or recirculated with a suitable device. A device such as a recirculating chiller (ThermoFlex available from ThermoFisher Scientific) may, for example, be used to keep the cooling medium at the desired temperature.

Another advantage of the method according to the present invention is the flexibility in the sequence of events. This flexibility arises because the droplets of dispersed phase can be frozen within the emulsion. In various embodiments of the invention, phase inversion is therefore followed by or involves removal of the biopolymer particles as described above. Phase inversion may be followed by decanting and then biopolymer particle removal from the mixture and/or phase inversion may involve mechanical filtration of the wetted particles from the anti-solvent/continuous phase/particle mixture.

Alternatively, the biopolymer particles may be removed from the continuous phase before phase inversion. In such embodiments, wetted frozen droplets may be removed from the sol (e.g. using filtration) and then phase inversion carried out to precipitate the biopolymer and form beads/particles thereof.

Having generally described this invention, a further understanding can be obtained by reference to certain specific examples illustrated below which are provided for purposes of illustration only and are not intended to be all inclusive or limiting unless otherwise specified.

Examples

A dispersed phase comprising 8 wt % cellulose in 70 wt % 1-ethyl-3-methylimidazolium acetate and 30 wt % dimethyl sulfoxide was prepared according to routine methods known in the art. This dispersed phase had a transition temperature (e.g. freezing point) of approximately 11° C. An aqueous continuous phase was also prepared according to routine methods known in the art. The continuous phase had a pour point of −15° C.

Figure 4:
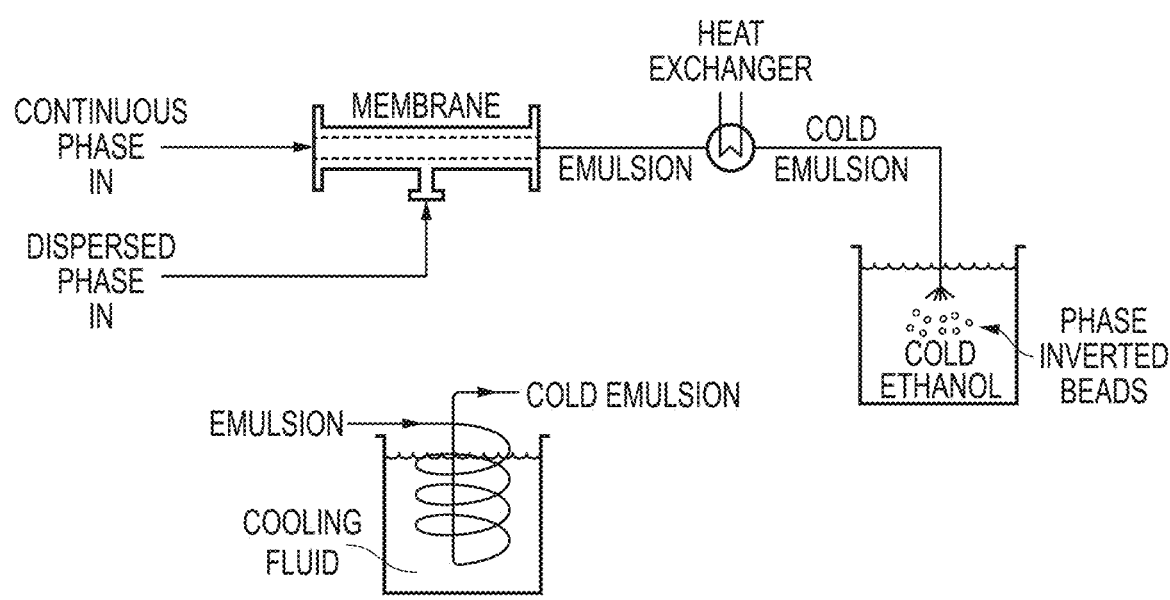
FIG. 4 is a diagrammatic representation of an embodiment of the method according to the present invention.

The dispersed phase and continuous phase were fed into a membrane emulsification unit as shown in FIG. 4 and an emulsion thereby formed. The emulsion was then cooled to a temperature between 0 and 11° C. before being transferred into a phase inversion unit with an ethanol anti-solvent to form cellulose particles.

Cooling of the emulsion was carried out with an immersed coil heat exchanger, as shown by the inset figure of FIG. 4. The immersed coil heat exchanger was chosen to maintain a laminar flow and minimise flow disturbances as the emulsion cooled. The coil heat exchanger contained a length (L) of coiled tubing with diameter D and pitch P, in a cold water bath at 0° C. and was sufficient to cool a 0.5 L/min emulsion to below 11° C. The temperature of the emulsion was monitored with a thermometer at the exit of the coil heat exchanger.

Figure 5A:
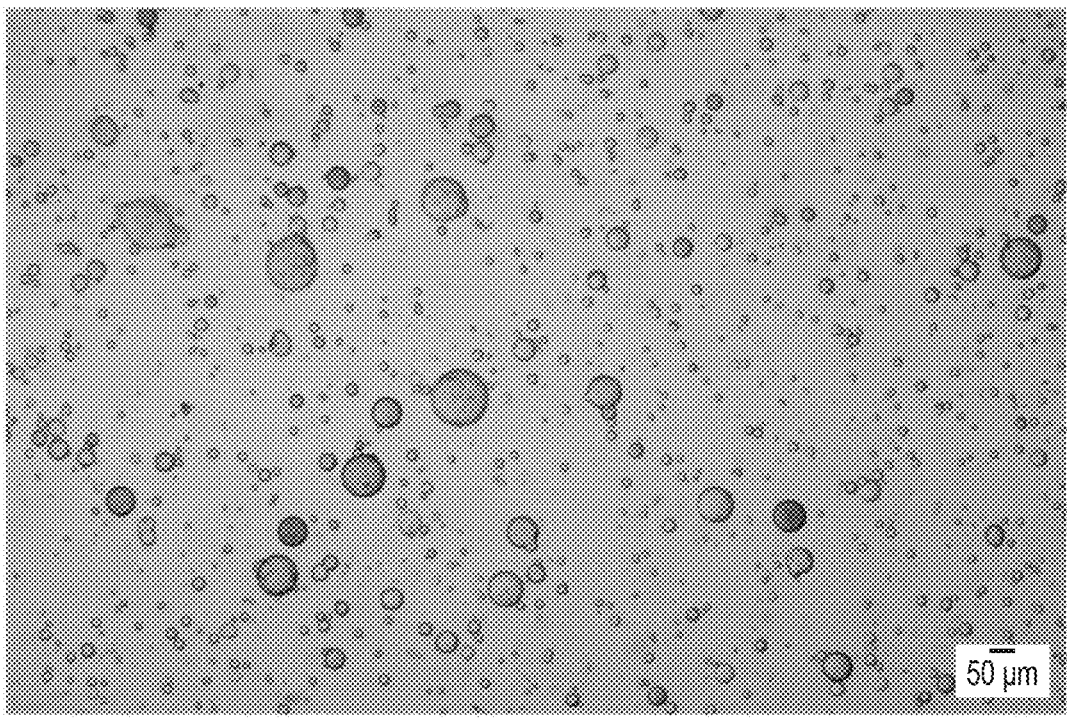
FIG. 5(a) is a photograph of cellulose particles obtained from a comparative example without emulsion cooling according to the present invention.
Figure 5B:
FIG. 5(b) is a photograph of cellulose particles obtained by the example described below according to the present invention.

A comparative example was also conducted in which cellulose particles were prepared without the cooling step. FIG. 5 includes two photographs (at 5× magnification) of the comparative example (a) and the example in accordance with the invention (b). It can be seen from these photographs how the use of the cooling step before phase inversion significantly reduced the degree of coalescence and aggregation of the cellulose particles. This translates into an improvement in yield.

The invention claimed is:

1. A method for preparing biopolymer particles, said method comprising:
   (a) a membrane emulsification of a dispersed phase into a continuous phase wherein the dispersed phase comprises the biopolymer in a solvent, and wherein passing the dispersed phase through the membrane forms an emulsion of the biopolymer in the continuous phase; and
   (b) a phase inversion with an anti-solvent to form particles of the biopolymer;
   wherein prior to (b), the emulsion is cooled to a temperature, $T_1$, $T_1$ being greater than the pour point of the continuous phase ($T_{cont}$), and equal to or less than a transition temperature of the dispersed phase ($T_{disp}$): $T_{cont} < T_1 \leq T_{disp}$;

wherein the transition temperature is selected from the group consisting of the freezing point, the glass transition temperature, and the pour point; and wherein $T_{disp} > T_{cont}$.

2. The method of claim 1, wherein the transition temperature of the dispersed phase is the freezing point.

3. The method of claim 1, wherein the transition temperature of the dispersed phase is the pour point.

4. The method of claim 1, wherein the transition temperature of the dispersed phase is the glass transition temperature.

5. The method of claim 1, wherein the anti-solvent is cooled to a temperature, $T_2$, for the phase inversion (b), $T_2$ being less than $T_{disp}$, preferably wherein $T_2$ is equal to $T_1$.

6. The method of claim 1, wherein the cooling of the emulsion is at the outlet of the membrane.

7. The method of claim 1, wherein the phase inversion is carried out under shear.

8. The method of claim 1, wherein the phase inversion comprises a filtration process.

9. The method of claim 1, wherein the membrane emulsification is selected from the group consisting of a cross-flow membrane emulsification, a rotational membrane emulsification, a vibrational membrane emulsification, and combinations thereof.

10. The method of claim 1, wherein the anti-solvent is aqueous and/or comprises an organic solvent.

11. The method of claim 1, wherein the method is continuous.

12. The method of claim 1, wherein after the phase inversion (b), the anti-solvent/continuous phase mixture is removed from the particles.

13. The method of claim 1, wherein the biopolymer is a polysaccharide, preferably wherein the biopolymer is cellulose.

14. Biopolymer particles prepared by the method of claim 1.

* * * * *